United States Patent [19]
Dimoff
[11] Patent Number: 4,563,803
[45] Date of Patent: Jan. 14, 1986

[54] VALVE REMOVING TOOL

[76] Inventor: John Dimoff, 7723 Ridgewood La., Burr Ridge, Ill. 60525

[21] Appl. No.: 487,506

[22] Filed: Apr. 22, 1983

[51] Int. Cl.⁴ .............................................. B23P 19/04
[52] U.S. Cl. ..................................... 29/213 R; 29/267
[58] Field of Search ................. 29/213 R, 213 E, 214, 29/219, 220, 267

[56] References Cited

U.S. PATENT DOCUMENTS

| | | | |
|---|---|---|---|
| 1,696,090 | 12/1928 | Jones | 29/220 |
| 3,479,722 | 11/1969 | Maness | 29/213 |
| 3,798,738 | 3/1974 | Purtell | 29/213 |

*Primary Examiner*—James L. Jones, Jr.
*Attorney, Agent, or Firm*—Dressler, Goldsmith, Shore, Sutker & Milnamow

[57] ABSTRACT

A hand-held tool for displacing a valve assembly from a cylinder or pump housing comprises an elongate handle portion having a distal end and a proximal end; a fulcrum member having a first end and a second end, the first end being rotatably secured to the distal end of the handle portion; a lever arm having a first end and a second end, the first end being rotatably secured to the handle portion between the distal and proximal ends, the second end including means for engaging the upper end of the valve assembly within the pump housing; and a bar connected to the second end of the fulcrum member, the bar including an opening slot for passage of the lever arm therethrough and a tab at one end for engaging the upper end of the pump housing whereby as the handle portion is moved downwardly, the engaging means forces the valve assembly through the pump housing.

3 Claims, 5 Drawing Figures

Fig. 1
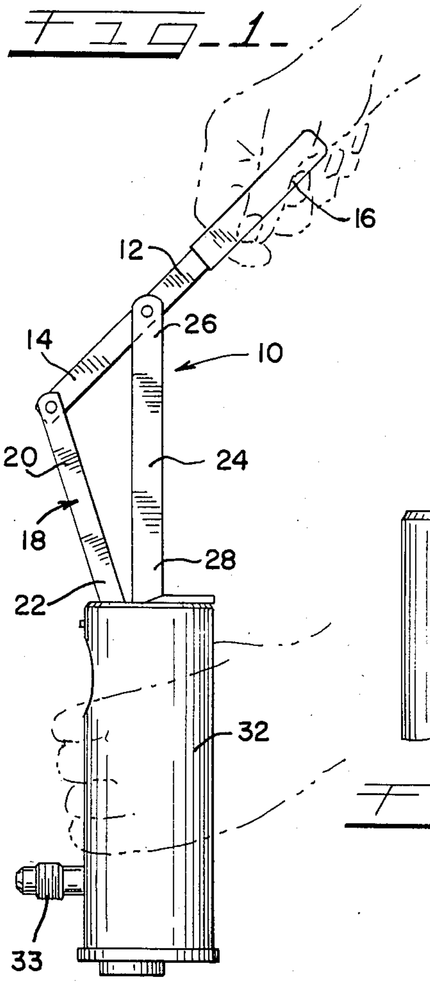
Fig. 2
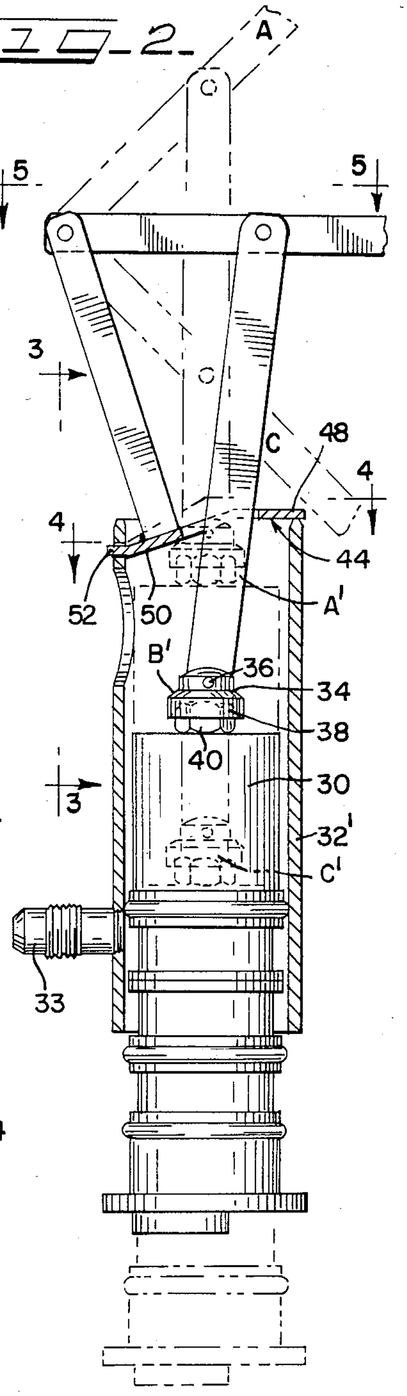
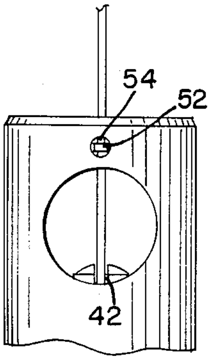
Fig. 3
Fig. 4
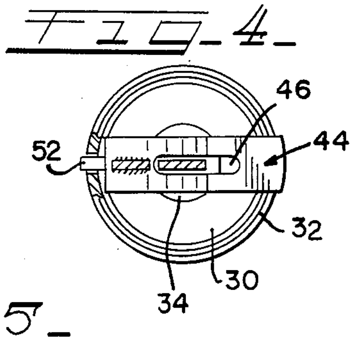
Fig. 5
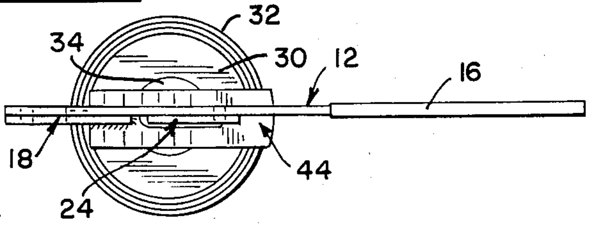

VALVE REMOVING TOOL

BACKGROUND OF THE INVENTION

The present invention relates in general to a device for removing an article from a casing and, in particular, to a hand-held device for displacing a valve assembly that is friction-fitted within a housing of a cylindrical proportioning pump.

The device is particularly applicable for use in the cleaning and maintenance of equipment employed in the rapid dispensing of semifrozen confection food products formed by mixing a prepared, storable solution with a measured quantity of air. Such products are commonly known as "soft ice cream" and are dispensed from a combined proportioning and freezing apparatus.

Semifrozen confection food dispensers, however, require thorough cleaning on a daily basis for health and safety reasons. The pump and valve assembly in such dispensers must be disassembled, hand washed and then reassembled in the apparatus. Because the valve assembly is friction-fitted within the pump housing, pressure must be exerted at one end of the valve assembly to displace the assembly from the housing.

The device of the present invention is a convenient means for rapidly and easily removing the valve assembly from a cylindrical pump housing or the like for cleaning.

SUMMARY OF THE INVENTION

The present invention relates to a hand-held tool for removing an article such as a valve assembly from a pump housing in the form of a casing or cylinder comprising an elongate handle portion having a distal end and a proximal end; a fulcrum member having a first end and a second end, the first end being rotatably secured to the distal end of the handle portion; a lever arm having a first end and a second end, the first end being rotatably secured to the handle portion between the distal and proximal ends, the second end including means for engaging the upper end of the valve assembly within the pump housing; and a bar connected to the second end of the fulcrum member, the bar including an opening for passage of the lever arm therethrough and a tab at one end for engaging the upper end of the pump housing whereby as the handle portion is moved downwardly, the engaging means forces the valve assembly through the pump housing.

BRIEF DESCRIPTION OF THE DRAWINGS

FIG. 1 is an elevational view of one embodiment of the present device removably secured to the upper end of a pump housing;

FIG. 2 is a sectional view showing the device in operation;

FIG. 3 is a sectional view taken along the line 3—3 of FIG. 2;

FIG. 4 is a sectional view taken along the line 4—4 of FIG. 2; and FIG. 5 is a sectional view taken along the line 5—5 of FIG. 2.

DETAILED DESCRIPTION OF THE INVENTION

Referring to FIGS. 1 and 2, the device of the present invention which is indicated generally by the reference numeral 10 includes an elongate handle portion 12 having a distal end 14 and a proximal end 16. A fulcrum member 18 having a first end 20 and a second end 22 is rotatably secured at the first end 20 to the distal end 14 of the handle portion 12. A lever arm 24 having a first end 26 and a second end 28 is rotatably secured at the first end 26 to the handle portion 12 at a point between the distal and proximal ends.

The second end 28 of the lever arm 24 includes means for engaging the upper end of an article 30 held within a casing or cylinder 32 (see FIG. 2). For purposes of illustration, the article 30 can be a valve assembly within a cylindrical pump housing having a laterally extending outlet connection 33 at the lower end thereof in communication with a freezing compartment and a dispenser for the passage of a flowable material.

The engaging means comprises a socket member 34 connected to the second end 28 by a pin 36. In a preferred embodiment, the lower end of the socket member 34 includes a recess 38 for engaging a hex nut 40 or the like positioned at the upper end of the valve assembly. The upper end of the socket member 34 can include a cutaway section 42 for receiving the second end 28 of the lever arm 24 (see FIG. 3).

Referring again to FIG. 2, the second end 22 of the fulcrum member 18 is connected to a bar 44 which is adapted to engage the upper end of the cylinder 32. The bar 44 includes an opening comprising an elongate slot 46 (see FIGS. 4 and 5) for passage of the lever arm 24 therethrough. One end 48 of the bar 44 engages the upper rim of the cylinder 32, whereas the other end 50 of the bar includes a tab portion 52 which can be inserted within a passage 54 in the upper side wall of the cylinder. That feature is clearly shown in FIGS. 2 and 3.

FIG. 2 illustrates three positions of the device 10 and the corresponding positions of the valve assembly 30 relative to the cylinder 32. In a first position A (shown in phantom) the device is secured to the upper end of the cylinder so that the end 48 of the bar 44 engages the rim of the cylinder with the valve assembly at a position A′, and the tab portion 52 is inserted into the passage 54. As the handle portion 12 is moved downwardly to a position B, the valve assembly 30 is displaced to a position B′. Further movement of the handle portion 12 in a downward direction to C displaces the valve assembly to a position C′. Whereby the valve assembly can be easily removed from the cylinder.

FIG. 4 shows the cooperation between the lever arm 24 and the elongate slot 46 of the bar 44. Also shown is the tab portion 52 held within the passage 54 at the upper end of the cylinder. FIG. 5, on the other hand, illustrates the configuration of the device when the handle portion 12 is in the position B of FIG. 2.

It will be understood that changes and modifications can be made in the above-described invention, without departing from the spirit thereof, particularly as defined in the following claims.

That which is claimed is:

1. A tool for removing an article defining a projection from a hollow casing comprising an elongate handle having a distal end and a proximate end; a fulcrum member having a first end and a second end; means rotatably connecting the distal end of said handle to the first end of said fulcrum member; a lever arm having a first end and a second end; means rotatably connecting the first end of said lever arm to an intermediate portion of said handle; means secured to the second end of said lever arm for engaging the upper end of the article within the casing comprising a member having at its upper end a cut-away section for receiving the second end of said lever arm and a recess at its lower end for receiving said projection; a bar connected to the second end of said fulcrum member and removably connectable to said casing, said bar defining an opening through which the lever arm can pass to interconnect the handle to the article in said casing, whereby as the handle is moved downwardly the article is moved relative to said casing.

2. A tool according to claim 1 in which the opening defined by the bar comprises an elongate slot through which the lever arm can pass.

3. A tool according to claim 1 in which the casing includes a passage and said bar includes a tab portion at one end thereof for engaging said passage to removably connect the bar to the casing.

* * * * *